Dec. 24, 1957  F. M. B. STENZEL  2,817,484
SELF-SUPPORTING SHELL FOR FLYING BODY
Filed Jan. 8, 1954

Inventor
Fritz Mirko B. Stenzel
By Wenderoth, Lind & Ponack
Attys.

United States Patent Office 2,817,484
Patented Dec. 24, 1957

2,817,484

SELF-SUPPORTING SHELL FOR FLYING BODY

Fritz Mirko B. Stenzel, Alamagordo, N. Mex., assignor to Machine Tool Works Oerlikon, Administration Company, Zurich-Oerlikon, Switzerland, a Swiss company Application January 8, 1954, Serial No. 402,959

Claims priority, application Switzerland January 17, 1953

3 Claims. (Cl. 244—119)

The invention relates to self-supporting shells for flying bodies, for example rockets.

It has already been proposed to produce hollow bodies, for example aircraft fuselages, by coiling up wooden strips and fabrics tapes crosswise on a fixed core and cementing the same together, said core being removed after finishing the coil. Known are also fuselages which consist of individual transverse rings and a great number of longitudinal stringers, around which single-start or multi-start coils of tapes of fabric or other materials are wound, if desired.

The first mentioned manner of construction yields a self-supporting fuselage but has the disadvantage that the fitting of the crosswise wound wooden strips forms a comparatively time-wasting and expensive operation.

The second form of construction is not self-supporting, the coiled tapes serving mainly as a coating of the fuselage and not being capable of taking stresses, the latter being taken by the fuselage frame work arranged inside the said fuselage. The fuselage is thereby rendered comparatively heavy, and the fuselage frame work, in particular the individual transverse connection rings, block up part of the interior of the fuselage so that the same can be utilized but partly.

In both embodiments as aforesaid the structural material is moreover easily inflammable and consequently unsuited for rocket bodies.

It is the main object of the present invention to provide a self-supporting shell for a flying body, for example rocket, which distinguishes itself by very light weight and great resistance to mechanical, thermal and atmospheric influences.

It is another object of the invention to provide a method of quickly and inexpensively producing such shells.

With these and other objects in view, I provide a self-supporting shell for flying bodies, comprising in combination: a metal wire of hollow profile of closed cross-section helically coiled having adjacent turns contacting one another laterally forming the shell proper, longitudinal stringers contacting the said shell, and a bonding agent bonding the said adjacent turns to one another and the said stringers to the coiled shell.

The said longitudinal stringers may be attached on the outer, or preferably on the inner surface of the said shell. As a material for the profile wire and for the longitudinal stringers a light metal alloy is used which has the advantage of high strength at low weight, and as a bonding agent any of the known cements for metals may be used for instance: "Araldit."

Cemented connections can transmit tensile forces to a limited degree only. However, such forces occur in one half of the shell when stressing the same in bending, while the other half of the shell is subject to compressive stresses. For the relief of the cemented connections it may therefore be convenient to make the shell proper yieldable in the axial direction and to take up the longitudinal forces by the said rigid longitudinal stringers, while the coiled shell merely takes the shear forces.

In the drawings which illustrate embodiments of the invention,

Figure 2:
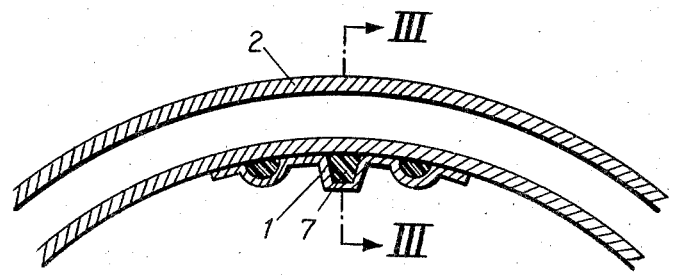
Fig. 2 is a transverse part section to Fig. 1 on a larger scale.
Figure 3:
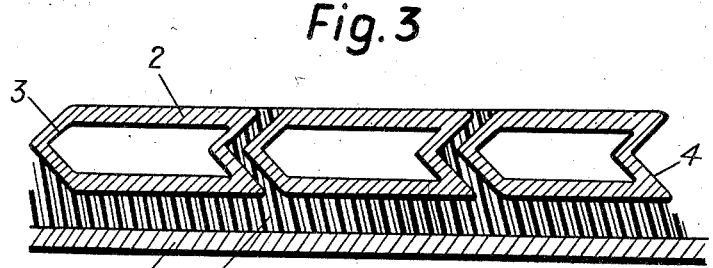
Fig. 3 is a section of an embodiment of a hollow wire of a closed profile.
Figure 4:
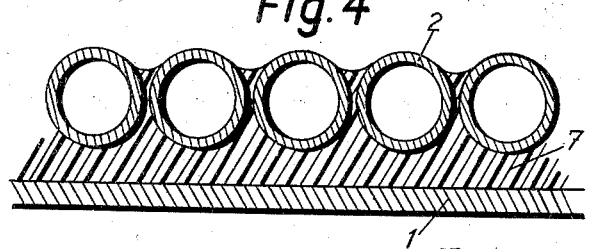
Fig. 4 is a section of a closed circular, i. e. tubular, profile.

Figs. 3 and 4 being transverse to Fig. 2 and on a larger scale still.

Figure 1:
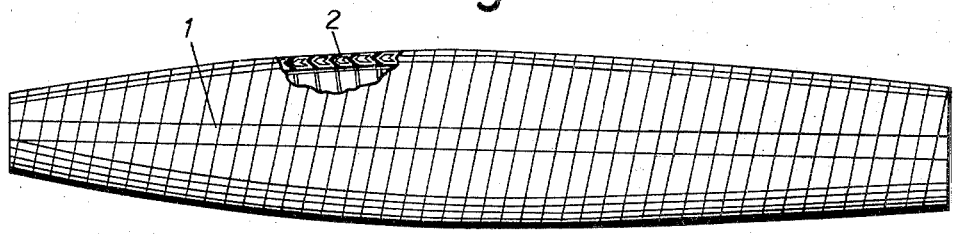
Fig. 1 is a lateral elevation of a coiled shell of a flying body according to the invention.

Referring first to Fig. 1, a streamlined body open at and tapering towards both ends is formed by a combination of a coiled member 2, the adjacent turns of which contact one another laterally, with stringers 1 extending longitudinally in contact with the coiled member 2, one such stringer 1 only being shown for clarity.

Fig. 2 shows that the coiled member 2 is hollow, and that the stringer 1 has for example longitudinal corrugations and is attached to the inner surface of the coiled member 2.

Fig. 3 shows adjacent turns of a hollow flat member 2, one end 3 of its closed profile being convex or projecting, and the other end 4 being concaved or recessed, the opposite ends 3, 4 of adjacent turns fitting into one another.

Fig. 4 shows adjacent turns of a tubular coiled member i. e. of a closed hollow circular profile 6, bonded together by a bonding agent 7.

The circular profile illustrated in Fig. 4 has the property of pliably yielding in the axial direction to tensile or compressive loads, whereas the profile illustrated in Fig. 3 does not permit any expansion in the direction of the axis of the shell but offers on the other hand the advantages that it provides in the coiled condition a smoother surface, and that the bonded connections of the interengaging profiles have a higher strength, particularly against shear stresses, than the circular profile illustrated in Fig. 4, owing to its comparatively large bonding area.

For the production of the coiled body a collapsible reel of the usual type is used which has several longitudinal bars corresponding in shape to the contour of the body to be coiled. For example with a bonded construction of a coiled body having internal longitudinal stringers of profiled light metal as shown in Figs. 1 and 2, the longitudinal stringers 1 are preferably placed on the longitudinal bars of the reel prior to the beginning of the coiling operation, and are spread over on their outer faces with the bonding agent. Thereafter the recessed side wall of the profile of a type shown in Fig. 3 is filled with the bonding agent, and the wire is wound on by turning the reel. By means of a guide carriage of the usual construction having guide rollers it is attained that each turn of the profile wire when being wound on comes into the position desired, and each turn contacts snugly the preceding one. When the coiling process is terminated, the whole surface of the body is conveniently coated with the bonding agent so that a uniformly smooth covering layer is formed.

Since at present there is not yet any bonding agent for metal available which sets at room temperature and has a sufficient strength as well as resistance to atmospheric influences, the whole coiled body has to be covered with a tray and to be connected to a hot air circulation. The heating-up can, however, be effected alternatively in a different manner, for example by means of high frequency heating.

After the drying of the bonding agent the reel is folded together and is removed from the coiled body which by then has become self-supporting. The use of a collapsible reel allows the construction of coiled bodies of streamlined shape tapering at both ends.

If desired, the cross section of the hollow wire profiles used may be made substantially rectangular or square.

While I have described hereinabove, and illustrated in the accompanying drawing, what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A self-supporting shell for flying bodies, comprising in combination: a metal wire of hollow profile helically coiled and forming the shell proper of the body, longitudinal stringers contacting the said shell, and a bonding agent bonding the said adjacent turns to one another and the said stringers to the said coiled shell.

2. A self-supporting shell for flying bodies, comprising in combination: a helically coiled metal wire of hollow profile having a concave side wall at one side and a convex side wall at the opposite side of the said profile fitting into the concave side wall of the adjacent turn of the said helically coiled wire, longitudinal stringers contacting the said helically coiled wire, and a bonding agent bonding adjacent turns of the said helically coiled wire to one another and the said stringers to the said helically coiled wire.

3. A self-supporting shell for a flying body, comprising in combination: a tubular closed profile metal member of circular cross-section helically coiled having adjacent turns forming the shell proper of the said body, longitudinal stringers contacting the said shell, and a bonding agent bonding the said adjacent turns to one another and the said stringers to the said shell.

References Cited in the file of this patent

UNITED STATES PATENTS

| | | |
|---|---|---|
| 776,737 | Greenfield | Dec. 6, 1904 |
| 1,932,430 | Weyerbacher | Oct. 31, 1933 |
| 2,111,923 | Briggs | Mar. 22, 1938 |
| 2,210,353 | Barnes | Aug. 6, 1940 |
| 2,351,152 | Schick | June 13, 1944 |
| 2,420,292 | Baer et al. | May 13, 1947 |
| 2,455,838 | Wallis | Dec. 7, 1948 |

FOREIGN PATENTS

| | | |
|---|---|---|
| 1,007,252 | France | Mar. 12, 1948 |